Figure 1:
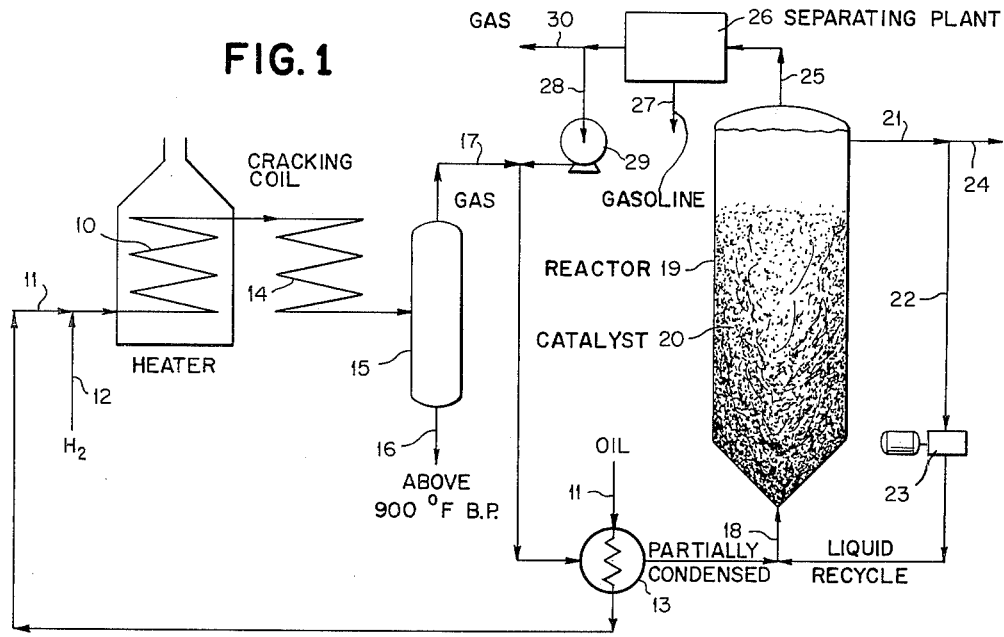

United States Patent Office 3,050,459
Patented Aug. 21, 1962

3,050,459
TWO-STAGE CONVERSION OF HEAVY OILS
Seymour C. Schuman, Princeton, N.J., assignor to Hydrocarbon Research, Inc., New York, N.Y., a corporation of New Jersey
Filed Jan. 13, 1959, Ser. No. 786,490
12 Claims. (Cl. 208—97)

This invention relates to the treatment of hydrocarbon oils with hydrogen in the presence of catalysts. More particularly, the invention is concerned with the treatment of heavy hydrocarbon oils to effect hydrodesulfurization.

Hydrodesulfurization has long been used to refine hydrocarbon oils and is a highly developed art insofar as the catalysts, temperatures, pressures and other process variables are concerned. Notwithstanding the extensive advances which have been made in hydrodesulfurization, the initial costs of suitable catalysts and the cost of regenerating such catalysts remain as important economic problems in the commercial utilization of hydrodesulfurization. Catalysts for the hydrodesulfurization of oils tend to become rapidly fouled with carbonaceous deposits and other contaminants in the charge stock, so that the activity of the catalyst can be maintained only by frequent regeneration of the catalyst. Regeneration of the catalyst necessitates interruption of the hydrodesulfurization operation or, as is more frequently the case, the provision of duplicate reactors so that while one reactor is on stream for the treatment of the charge stock, the other reactor is undergoing regeneration of the catalyst. In either case, the costs associated with the regeneration of the catalyst materially affect the economics of the hydrodesulfurization process. The frequency of catalyst regeneration is so increased when the charge stock is a heavy hydrocarbon oil that heretofore it has not been practical to refine such a heavy oil by the catalytic hydrodesulfurization process.

An important improvement in the art of treating heavy hydrocarbon oils in the presence of catalysts has been effected by an invention described in the copending application of Percival C. Keith and Edwin T. Layng, Serial No. 737,711, filed May 26, 1958, now U.S. Patent 2,987,467.

In accordance with that invention, the hydrodesulfurization of a heavy hydrocarbon oil is advantageously carried out in two successive steps involving, first, the cracking of the oil and, then, the catalytic hydrogenation of the cracked oil, while the oil is maintained largely in the liquid phase in both steps. The gist of the invention is the liquid-phase cracking of heavy hydrocarbons as a preparatory operation so that the sulfur present in such hydrocarbons is better exposed to and more reactive with hydrogen during subsequent liquid-phase catalytic hydrogenation.

By proceeding in that manner, it is possible to diminish the quantity of catalyst used and, at the same time, reduce the frequency of regeneration of the catalyst, since fouling up of the catalyst occurs to a much smaller degree than hitherto experienced.

Nevertheless, it has now been found that the fouling of the hydrogenation catalyst can be decreased still further to a material extent so that the commercial attractiveness of the process of the aforesaid copending application is enhanced.

Accordingly, a principal object of the present invention is to catalytically hydrogenate sulfur-containing heavy oils having a substantial amount of hydrocarbons boiling above 900° F. by a process which materially decreases contamination of the catalyst by such compounds which will inhibit or cut down considerably its activity.

Other objects and advantages of the present invention will be apparent from the description which follows:

The method of this invention involves two stages. In the first stage, the heavy oil which contains at least about 10% by volume of hydrocarbons boiling above 900° F. is cracked in the liquid phase in the presence of hydrogen, with or without a mass of solid particles acting to increase the surface over which reaction takes place, but in the absence of a catalyst. Before the resulting cracked hydrocarbons are passed from this first stage to the second stage, hydrocarbons boiling above about 900° F. are removed. Frequently, a substantial portion of the hydrocarbons boiling in the ranges of furnace oils and catalytic cracking stocks is also separated from the hydrocarbon stream from the first stage before it enters the second stage. All of the vapors and gases leaving the first stage reactor are passed to the second stage reactor wherein only hydrocarbons boiling not in excess of about 900° F. are hydrogenated.

The feature of this invention is the removal of very high boiling hydrocarbons from the cracked hydrocarbons leaving the first stage of the process. It has been found that the contamination of the hydrogenation catalyst in the second stage is due mainly to impurities which are present in the hydrocarbon oil to begin with and which collect almost entirely in the liquid hydrocarbon fraction boiling above about 900° F. Such impurities which act as catalyst poisons include asphaltenes, highly condensed aromatic compounds and inorganic or metallo-organic compounds. By eliminating these contaminants from the precracked hydrocarbons entering the second and final stage, the life of the catalyst is increased to a marked extent and regenerations are generally needed only after several months of operation.

Both stages of the process are carried out at elevated temperatures and pressures. In the first stage, in which at least 25% by volume of the hydrocarbons boiling above 900° F. are cracked to hydrocarbons boiling below 900° F., the temperature will generally not exceed 1000° F. and preferably will be in the range of 825 to 950° F., while the pressure will not exceed 5000 pounds per square inch gauge (p.s.i.g.) and preferably will fall in the range of 800 to 3000 p.s.i.g.

It is known that the high boiling oils which are contemplated for treatment according to the invention contain sulfur in the form of compounds which are very refractory to attack by hydrogen in conventional hydrodesulfurization processes. By the intensive cracking performed in the first stage, the elimination of sulfur in the second stage is considerably enhanced. As a further promoting agent for the cracking operation, substantially non-catalytic, comminuted solids like sand, alumina, clay or bauxite may be in contact with the liquid phase in the first stage. Inasmuch as hydrogen must be present in the second stage of the process, it is generally advisable to introduce all of the desired hydrogen into the cracking stage whence all of the unconsumed hydrogen is passed to the second stage.

It is especially desirable to effect, pursuant to this invention, the liquid-phase hydrocracking of heavy oils which have troublesome contents of salts and complexes of metals like nickel and vanadium. Such ash-producing contaminants are injurious to catalysts but are converted in the first stage of the process to forms no longer injurious to catalysts. Hence, the amount, if any, of such contaminants remaining in the hydrocarbon stream entering the second catalytic stage is a very small fraction of the amount originally present in the heavy oil fed to the first stage of the process.

A simple and inexpensive way in which hydrocarbons boiling above 900° F. may be eliminated from the cracked hydrocarbons that are to be treated further in the second catalytic stage of the process is to make a phase separation of the reaction effluent from the first stage without materially changing the temperature and pressure of that effluent. The gasiform phase which obviously contains unreacted hydrogen and gaseous hydrocarbons like methane and ethane also contains all of the hydrocarbons boiling in the gasoline range, the major portion of the hydrocarbons boiling in the furnace oil range and approximately half of the hydrocarbons boiling in the catalytic cracking stock range. The liquid phase contains not only all the hydrocarbons boiling above 900° F. but also the remaining minor portion of the furnace oil hydrocarbons and the remainder of the catalytic cracking stock hydrocarbons. For instance, if a phase separation is made of the reaction effluent from the first cracking stage at the operating conditions of say 850° F. and 1500 p.s.i.g., the gasiform phase will typically include on the border of 100% of the gasoline hydrocarbons, 80% of the furnace oil hydrocarbons and 50% of the catalytic cracking stock hydrocarbons, while the liquid phase will contain the remaining 20% of the furnace oil hydrocarbons, 50% of the catalytic cracking stock hydrocarbons and 100% of the hydrocarbons boiling above 900° F.

Having made a phase separation, it is possible to fractionate the liquid phase so as to send forward to the second catalytic stage as much of the hydrocarbons therein boiling up to 900° F. as may be desired. Since a well hydrogenated stock is advantageously used as feed to conventional catalytic cracking units of the fluidized or moving bed type, it is often advisable to fractionate the liquid phase so that only hydrocarbons boiling above about 900° F. are removed from the hydrocarbons sent to the second stage.

All of the gasiform phase, alone or together with any selected fraction of the liquid phase not boiling in excess of about 900° F., is partially cooled and introduced into the second stage reactor. The cooling is preferably done by heat exchange with feed oil. The temperature in the second stage is generally maintained below about 850° F., preferably in the range of 750 to 830° F., and the pressure below 5000 p.s.i.g., preferably 800 to 3000 p.s.i.g.

Any sulf-active hydrogenation catalyst may be used in the second hydrodesulfurization step of this invention. Among the more prominent catalysts which may be used are cobalt molybdate deposited on alumina, tungsten sulfide and the mixed oxides of iron and chromium.

The hydrogen which is supplied to the reaction system is usually in the form of a gaseous stream containing other constituents such as carbon oxides, nitrogen, methane, ethane and steam. Usually for hydrodesulfurization, the hydrogen-containing gas introduced into the catalytic hydrodesulfurization zone should provide at least 250 cubic feet (standard conditions) of hydrogen for each barrel of charge stock undergoing treatment. Preferably, the hydrogen rate is in the range of about 500 to 2000 cubic feet per barrel of charge stock entering the catalytic hydrodesulfurization zone.

As brought out in the copending application Serial No. 457,839, filed September 23, 1954, by H. R. Pichler, now U.S. Patent 2,910,433, issued October 27, 1959, hydrodesulfurization is advantageously carried out with a substantial recycling of the treated oil. While a recycling rate of 2 volumes of treated oil per volume of charge stock is beneficial, recycling rates in the range of about 10:1 to 20:1 are particularly desirable. With the recycling of treated oil, it is expedient to recycle also hydrogen leaving the catalytic hydrodesulfurization zone. The recycled hydrogen when added to fresh hydrogen supplied to the hydrodesulfurization zone corresponds to a total of approximately 1,000 to 10,000 cubic feet per barrel of the charge stock entering the hydrodesulfurization zone.

To facilitate understanding of the present invention further, reference is now made to the accompanying drawings which diagrammatically represent typical flowsheets embodying the two-step process of the invention with the interposed separation step to eliminate hydrocarbons boiling above about 900° F.

FIGURE 1 shows an apparatus containing a preheating coil 10 to which charge stock or heavy oil is supplied by line 11. Before entering coil 10, the oil is admixed with a hydrogen-containing gas supplied by line 12. The oil is first passed through heat exchanger 13 where it receives heat from a gasiform stream later to be described. Additional heat is supplied to the oil in preheating coil 10 so as to heat it up to a temperature of about 750° F. to start the hydrocracking reaction which then proceeds in cracking coil 14 without further heating since hydrocracking is an exothermic reaction. The liquid-phase cracked oil and the hydrogen-containing gasiform phase of the reaction effluent from coil 14 are separated in separator 15. The liquid phase is withdrawn through pipe 16, while the gasiform phase passes through line 17 and heat exchanger 13 to give up some heat to the charge stock as previously mentioned. From there, it flows in partially condensed form to the bottom of second stage reactor 19 by way of line 18. Reactor 19 contains catalyst mass 20. The rate of flow of liquid through reactor 19 is sufficiently high to suspend the particles of the catalyst mass with a random movement but insufficient to carry these particles out of the reactor. The technique of causing random movement of particulate masses by upward flow of a liquid is called ebullation in copending application Serial No. 737,711, filed May 26, 1958 and application Serial No. 743,304, filed June 20, 1958 and now U.S. Patent 2,987,465, which describe this technique in detail. At the top of reactor 19, liquid is withdrawn through pipe 21, a large portion of this liquid being recycled to reactor 19 by means of line 22 and pump 23, and the remainder of the liquid leaving the reaction system through line 24 as product.

The gasiform phase leaves reactor 19 through line 25 and flows to separating plant 26 wherein gasoline hydrocarbons are condensed and withdrawn as product through line 27, while vapor-free gas rich in hydrogen is partially recycled through line 28 and blower 29 back into line 17. The remainder of the vapor-free gas is withdrawn through line 30; often, part of this gas which contains hydrogen is recycled from line 30 to line 12 to provide hydrogen for the hydrocracking carried out in coil 14. Separating plant 26 may include an absorption system which separately recovers gaseous hydrocarbons like methane and ethane from the hydrogen-rich gas that is to be recycled through line 28.

The liquid phase withdrawn at line 16 may be marketed as fuel oil No. 6, with or without the addition of cutter stock. This liquid may also be flashed to atmospheric pressure or even distilled under reduced pressure to provide lower boiling hydrocarbon fractions.

Figure 2:
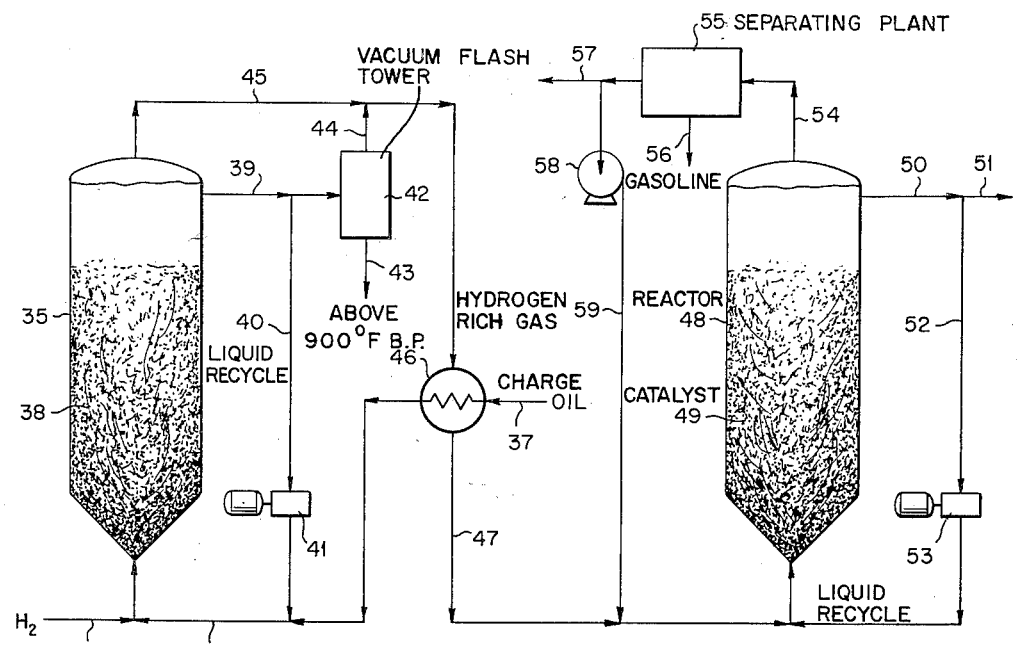

FIGURE 2 illustrates another embodiment of the present invention in which the step of separating the gasiform and liquid phases of the reaction effluent of the first cracking reactor is carried out in the same reactor. In this embodiment, cracking reactor 35 is a cylindrical vessel into which hydrogen-containing gas is fed from below through line 36 and heavy oil through line 37. Reactor 35 is filled to a substantial part of its height with a particulate mass 38 of non-catalytic soilds, e.g., sand or Alundum spheres, to promote hydrocarbon hydrocracking. The oil flow is so adjusted that the particulate mass is maintained in an ebullated state. While the mass of solids is expanded by ebullition, the randomly moving particles do not rise to the level of line 39 through which liquid is withdrawn from reactor 35. A large part of the withdrawn liquid is usually recycled to reactor 35 through line 40 by pump 41. The remainder of the liquid withdrawn through line 39 discharges into vacuum flash tower 42 which discards hydrocarbons boiling above 900° F. by way of line 43 while lower boiling hydrocarbons pass through line 44 for further treatment. The gasiform phase of the first cracking stage leaves reactor 35 through line 45 leading to heat exchanger 46 where the feed oil is preheated while the gasiform phase is partially condensed. This stream which also contains the hydrocarbons from line 44 then flows through line 47 into reactor 48 in which the second catalytic stage of desulfurization is performed.

In arrangement and operation, reactor 48 is quite similar to reactor 19 of FIGURE 1. A mass of sulf-active catalyst particles 49 is maintained in an ebullated state by the ascending liquid stream in reactor 48. The moving catalyst particles rise only to a certain level which is safely below line 50 for the discharge of the liquid phase. Part of this liquid is withdrawn through line 51 as product while another part is recycled by line 52 and pump 53 to reactor 48.

The gasiform phase leaves reactor 48 through line 54 and passes to separating plant 55 wherein it is treated to recover gasoline at line 56. Vapor-free gas rich in hydrogen is in part vented through line 57 and in part recycled to reactor 48 by blower 58 and line 59; another part of the gas in line 57 is often recycled to reactor 35.

For further illustration of the invention, a specific example of the operation of each of the systems shown in FIGURES 1 and 2 will be given herebelow.

Referring to FIGURE 1, a Kuwait residuum having a gravity of 8° API, a sulfur content of 5.3% by weight, and over 90% by volume of hydrocarbons boiling above 900° F., is charged into preheating coil 10 together with a hydrogen-rich gas providing 1700 cubic feet (standard conditions) of hydrogen for each barrel of residuum. The mixture of hydrogen and residuum then passes through cracking coil 14 wherein liquid phase cracking of the oil occurs at a temperature between 825° F. and 875° F. and a pressure of about 1800 p.s.i.g. The reaction effluent from coil 14 enters separator 15 wherein the gasiform and liquid phases are separated. The gasiform phase containing no hydrocarbons boiling above 900° F. passes through heat exchanger 13 wherein this stream is cooled to a temperature of 750° F. and thereby partially condensed. Thence, the stream flows to reactor 19 containing a catalyst mass of cobalt molybdate on alumina granules of 4 to 8 mesh size. In order to maintain the catalyst granules in an ebullated state, the rate of flow of the liquid through reactor 19 is 80 gallons per minute per square foot of horizontal cross section. Treated oil from the top of reactor 19 is recycled to the bottom thereof by line 22 at the rate of 15 volumes for each volume of cracked oil flowing into reactor 19 from heat exchanger 13.

Reactor 19 is operated at a temperature of 810° F. and a pressure of 1750 p.s.i.g. Hydrogen-rich gas separated from the gasiform phase is returned through line 28 by blower 29 at a rate to provide with the hydrogen passing through coil 14 a total of 4,500 cubic feet of hydrogen for each barrel of cracked oil fed to reactor 19.

Liquid oil is withdrawn as product through line 24. This oil together with the gasoline and some higher boiling hydrocarbons recovered at line 27 has a gravity of 31° API, a sulfur content of 0.51% by weight and an end point of 860° F. This total oil product amounts to 82% by volume of the residuum charged to coil 14. The liquid withdrawn at line 16 amounts to 21% by volume of the residuum charged to coil 14 so that the total liquid yield of the process is 103%. The liquid from line 16 is salable as No. 6 fuel oil.

After 65 days of continuous operation, the total oil product still has a gravity of 30.7° API, a sulfur content of 0.73% by weight and an end point of 890° F. Thus, the catalyst shows hardly any loss of activity for this period of operation.

In contrast thereto, when the separation step between the first and second stage is omitted, the catalyst shows considerable decline of activity so that, after the same period of operation, and after removing, by distillation and blending, No. 6 fuel oil in the same amount previously withdrawn by line 16 from the total liquid product, the remaining liquid product has a gravity of 28.9° API and a sulfur content of 1.17% by weight.

In an operation of the system illustrated in FIGURE 2, Boscan oil is charged to reactor 35 through line 37 and hydrogen-containing gas through line 36. The oil consists of 63% by volume of hydrocarbons boiling above 900° F. and has a gravity of 10.5° API and a sulfur content of 5.1% by weight. The pressure in reactor 35 is maintained at 2500 p.s.i.g. A mass of sand (8 to 10 mesh size) is maintained in an ebullated state in this first cracking stage by the upward flow of the oil therethrough. The temperature in reactor 35 is 840° F. Cracked oil from this stage is returned through line 40 and pump 41 at the rate of 12 volumes per volume of Boscan oil charged through line 37. The combined flow of recycled oil and charge stock is 50 gallons per minute per square foot of horizontal cross section of vessel 35. Hyrogen is supplied at the rate of 1450 cubic feet (standard conditions) per barrel of charge stock, but hydrogen separated from the gasiform effluent leaving the second stage is recycled thereto so that the total amount of hydrogen entering reactor 48 is about 7000 cubic feet per barrel of cracked hydrocarbons entering reactor 48.

The liquid phase resulting from the cracking operation in reactor 35 is separated from the vapor phase and this liquid is fractionated in a vacuum still to separate therefrom hydrocarbons boiling above 900° F. The lower boiling hydrocarbons are admixed with the gasiform phase of the first stage and introduced into reactor 48.

Reactor 48 is maintained at a temperature of 800° F. and a pressure of 2450 p.s.i.g. Treated oil from this stage is returned by line 52 and pump 53 at the rate of 10 volumes per volume of cracked hydrocarbons charged to reactor 48. The upward flow of liquid is about 60 gallons per minute per square foot of horizontal cross section of vessel 48, ebullating with a 20% volume expansion the mass of catalyst pellets therein. The catalyst pellets are ⅛ inch diameter spheres of a silica-alumina catalyst support impregnated with cobalt molybdate.

The total product oil recovered from lines 51 and 56 shows the following values with slight variations over an operating period of 52 days: gravity 32° API and sulfur content 0.9% by weight.

When, however, no separation of hydrocarbons boiling above 900° F. is carried out after the first cracking stage, the catalyst becomes increasingly less effective so that after the same period of operation the oil recovered from the second stage, after being fractionated to an end point of 900° F., shows a gravity of 28° API and a sulfur content 1.6% by weight.

From the foregoing results it may be seen that the separation step of the invention permits continuous performance of refining operations on high-boiling, sulfur-containing hydrocarbons over an extended period without serious deterioration of the catalyst.

It will be understood that examples of the invention have been given by way of illustration and not of limitation and that many modifications may be made in such details relating to temperatures, pressures, amount of oil recycled and catalyst, without departing from the spirit of the invention. In the same vein, the process of the invention may be operated in a way that hydrocarbons boiling above 900° F. may be converted completely to hydrocarbons boiling not in excess of 900° F. For instance, the high-boiling hydrocarbons in line 43 of FIGURE 2 may be fully recycled to reactor 35 so that no hydrocarbons boiling above 900° F., ever leave the reaction system. Similarly, treated oil from line 24 of FIGURE 1 may in part be recycled to hydrocracking coil 14 or from line 51 of FIGURE 2 to reactor 35 as more fully taught by Michael C. Chervenak in copending application Serial No. 780,023, filed December 12, 1958 and now U.S. Patent 2,987,468. When hydrogen-containing gas is recycled from line 30 of FIGURE 1 or from line 57 of FIGURE 2 to the first stage of the reaction system, the amount of hydrogen flowing through the first stage may be economically maintained in the range of about 5000 to 10,000 cubic feet (standard conditions) per barrel of heavy oil charged and this high flow rate of hydrogen through the first stage reactor yields commercially attractive results.

What is claimed is:

1. A process for refining a sulfur-containing heavy oil having at least 10% by volume of hydrocarbons boiling above 900° F., which comprises cracking said oil while substantially in the liquid state and in the presence of hydrogen at a pressure of at least 800 p.s.i.g. to convert at least 25% by volume of said hydrocarbons boiling above 900° F. to hydrocarbons boiling not in excess of 900° F., separating and removing substantially all residual hydrocarbons boiling above 900° F. from the thus cracked oil, and reacting the remainder of said cracked oil substantially free of hydrocarbons boiling above 900° F. while substantially in the liquid state with hydrogen at a pressure of at least 800 p.s.i.g. in the presence of a particulate sulf-active hydrogenation catalyst to effect desulfurization.

2. The process of claim 1 wherein said oil is cracked at a temperature in the range of 825 to 950° F. and a pressure in the range of 800 to 3000 p.s.i.g.

3. The process of claim 2 wherein the remainder of said cracked oil substantially free of hydrocarbons boiling above 900° F. is reacted with hydrogen at a temperature in the range of 750 to 830° F. and a pressure in the range of 800 to 3000 p.s.i.g.

4. A process for refining a sulfur-containing heavy oil having at least 10% by volume of hydrocarbons boiling above 900° F., which comprises subjecting said oil while substantially in the liquid state to a cracking operation in the presence of hydrogen at an elevated temperature and pressure of at least 800 p.s.i.g. to convert at least 25% by volume of said hydrocarbons boiling above 900° F. to hydrocarbons boiling not in excess of 900° F., separating the reaction effluent of said cracking operation into a gasiform phase and a liquid phase without substantial decrease of temperature and pressure, removing the liquid phase as a product cooling said gasiform phase to condense partially the cracked hydrocarbons therein, and passing the thus cooled gasiform phase at a pressure of at least 800 p.s.i.g. through a mass of a particulate sulf-active hydrogenation catalyst to effect reaction between hydrogen and cracked hydrocarbons in said gasiform phase and consequent desulfurization.

5. The process of claim 4 wherein said liquid phase is fractionated and a fraction thereof substantially free of hydrocarbons boiling above 900° F. is passed with said cooled gasiform phase through said mass of hydrogenation catalyst.

6. The process of claim 4 wherein said gasiform phase is cooled by indirect heat exchange with said oil before said oil is subjected to said cracking operation.

7. The process of claim 1 wherein substantially all residual hydrocarbons boiling above 900° F. separated from the cracked oil are recycled to the cracking step.

8. A process for refining a sulfur-containing heavy oil having a major portion by volume of hydrocarbons boiling above 900° F., which comprises cracking said oil while substantially in the liquid state and in the presence of hydrogen at a pressure of at least 800 p.s.i.g. and a temperature not exceeding 1000° F. to convert at least 25% by volume of said hydrocarbons boiling above 900° F. to hydrocarbons boiling not in excess of 900° F., separating and removing substantially all residual hydrocarbons boiling above 900° F. from the thus cracked oil, and reacting the remainder of said cracked oil substantially free of hydrocarbons boiling above 900° F. and substantially in the liquid state with hydrogen at a pressure of at least 800 p.s.i.g. and a temperature below about 850° F. in the presence of a particulate sulf-active hydrogenation catalyst to effect desulfurization.

9. The process of claim 8 wherein the cracking of said oil is effected by passing the oil upwardly through a mass of substantially non-catalytic solid particles at such a rate as to form an ebullated mass and said particulate sulf-active hydrogenation catalyst is also maintained in an ebullated state by passage of said remainder of said cracked oil upwardly through said catalyst.

10. The process of claim 8 wherein said cracked oil is cooled by indirect heat exchange with said sulfur-containing heavy oil before said cracked oil is reacted with hydrogen in the presence of said particulate sulf-active hydrogenation catalyst.

11. The process of claim 1 wherein the cracked oil substantially free of hydrocarbons boiling above 900° F. and in liquid phase is passed upwardly through the particulate catalyst at a flow rate based on the density and size of the catalyst and the density of the liquid to expand the bed of catalyst with respect to its settled volume to cause random motion of the catalyst particles in the liquid but at a flow rate insufficient to carry over the particulate catalyst from the zone of the reaction.

12. The process of claim 8 wherein the cracking of the heavy oil and the subsequent reaction of the fraction of cracked oil which is substantially free of hydrocarbons boiling above 900° F. are separately accomplished by passing the liquids upward through beds of particulate solids at flow rates based on the density and size of the solids and the density of the liquid to expand the beds of particulate solids with respect to their settled volume to cause random motion of the particles in the liquid but at a flow rate insufficient to carry over the particulate solids from the zone of reaction.

References Cited in the file of this patent

UNITED STATES PATENTS

| | | |
|---|---|---|
| 2,880,165 | Adams et al. | Mar. 31, 1959 |
| 2,883,336 | Sweetser et al. | Apr. 21, 1959 |
| 2,899,376 | Krebs et al. | Aug. 11, 1959 |
| 2,909,476 | Hemminger | Oct. 20, 1959 |